Aug. 17, 1926.

V. A. FIORENTINO 1,596,010

INDICATOR FOR TAIL LIGHTS OF VEHICLES

Filed August 31, 1923  2 Sheets-Sheet 1

INVENTOR
Vito Antonio Fiorentino
BY
N. T. Criswell
ATTORNEY

Aug. 17, 1926.  1,596,010
V. A. FIORENTINO
INDICATOR FOR TAIL LIGHTS OF VEHICLES
Filed August 31, 1923    2 Sheets-Sheet 2
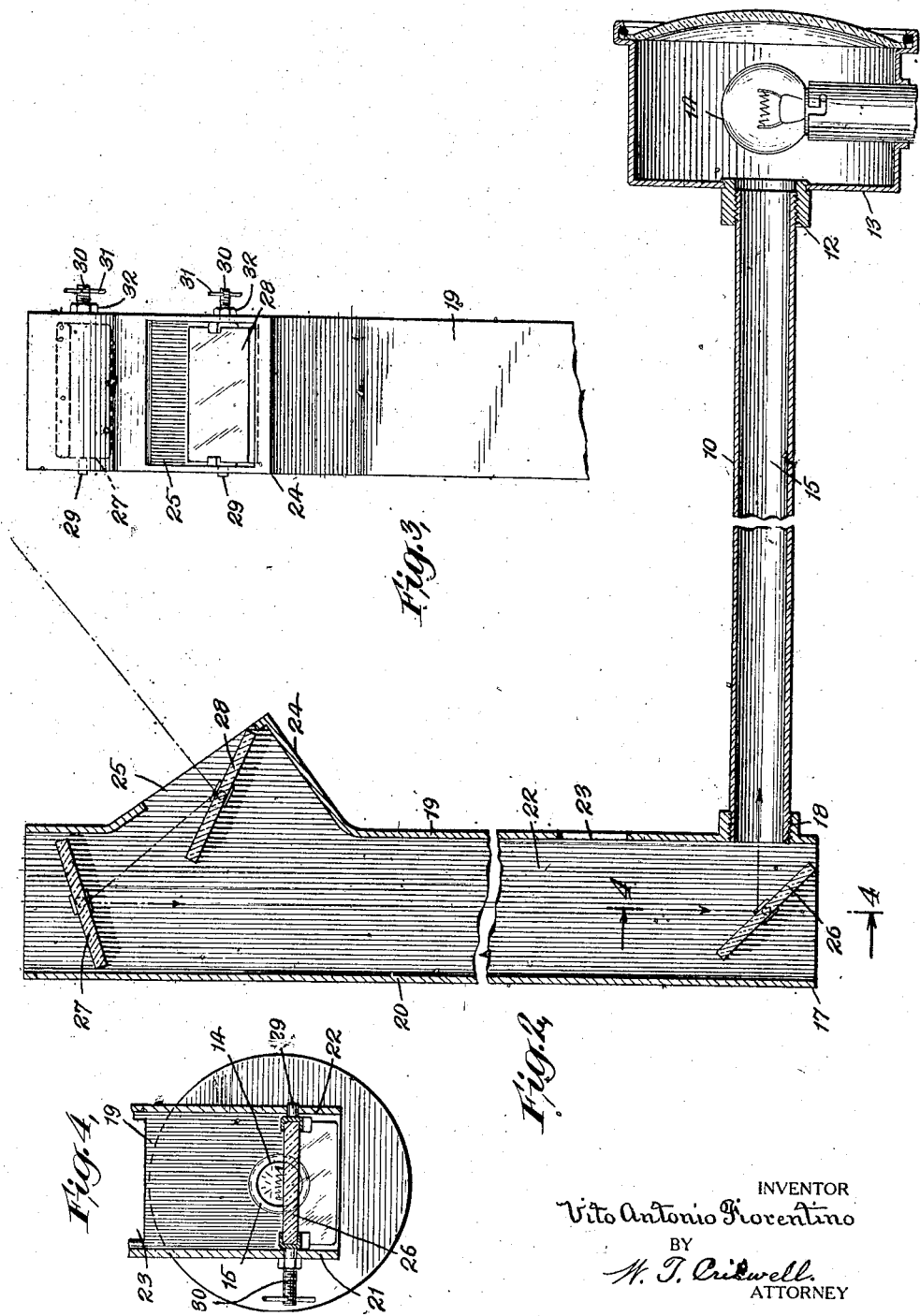
INVENTOR
Vito Antonio Fiorentino
BY
W. T. Criswell
ATTORNEY Patented Aug. 17, 1926.

1,596,010

UNITED STATES PATENT OFFICE.

VITO ANTONIO FIORENTINO, OF LONG ISLAND CITY, NEW YORK.

INDICATOR FOR TAIL LIGHTS OF VEHICLES.

Application filed August 31, 1923. Serial No. 660,354.

This invention relates more particularly to a class of devices adapted to be used in conjunction with the tail lamps of vehicles. My invention has for its object primarily to provide a device or indicator designed to be employed on vehicles, such as automobiles, autotrucks, motorcycles and the like, for permitting the driver or chauffeur to observe at frequent intervals if the tail lamp of the vehicle is lighted without being required to move from the interior of the vehicle, and which serves to avoid liability of payment of penalties for not displaying a tail light when the vehicle is travelling by enabling the lamp to be timely lighted especially in event of the light being accidentally extinguished. The invention consists essentially of means adapted to be applied to a vehicle for providing a passage for transmitting the rays of light from the tail lamp to the front part of the vehicle, and one or more reflectors are provided for being adjustably supported on the front of the vehicle whereby the rays of light transmitted through the passage will be reflected so that the operator of the vehicle may observe at frequent intervals if the tail lamp is lighted without being required to get out of the vehicle.

A further object of the invention is to provide an indicator for the tail lights of vehicles of a simple, efficient and durable construction which may be made of suitable material in any appropriate shape and size.

With these and other objects in view, the invention will be hereinafter more fully described with reference to the accompanying drawings forming a part of this specification in which similar characters of reference indicate corresponding parts in all the views and will then be pointed out in the claims at the end of the description.

In the drawings, Figure 1 is a side elevation, partly broken away, of a vehicle with one form of the indicator embodying my invention applied thereto.

Fig. 2 is an enlarged sectional view, partly broken away, and partly fragmentary, taken through one form of the device and through a tail lamp.

Fig. 3 is an enlarged fragmentary view showing a front elevation of the casing with two of the upper reflectors as used in the device, and Fig. 4 is an enlarged fragmentary sectional view taken on the line 4—4 of Fig. 2.

Figure 1:
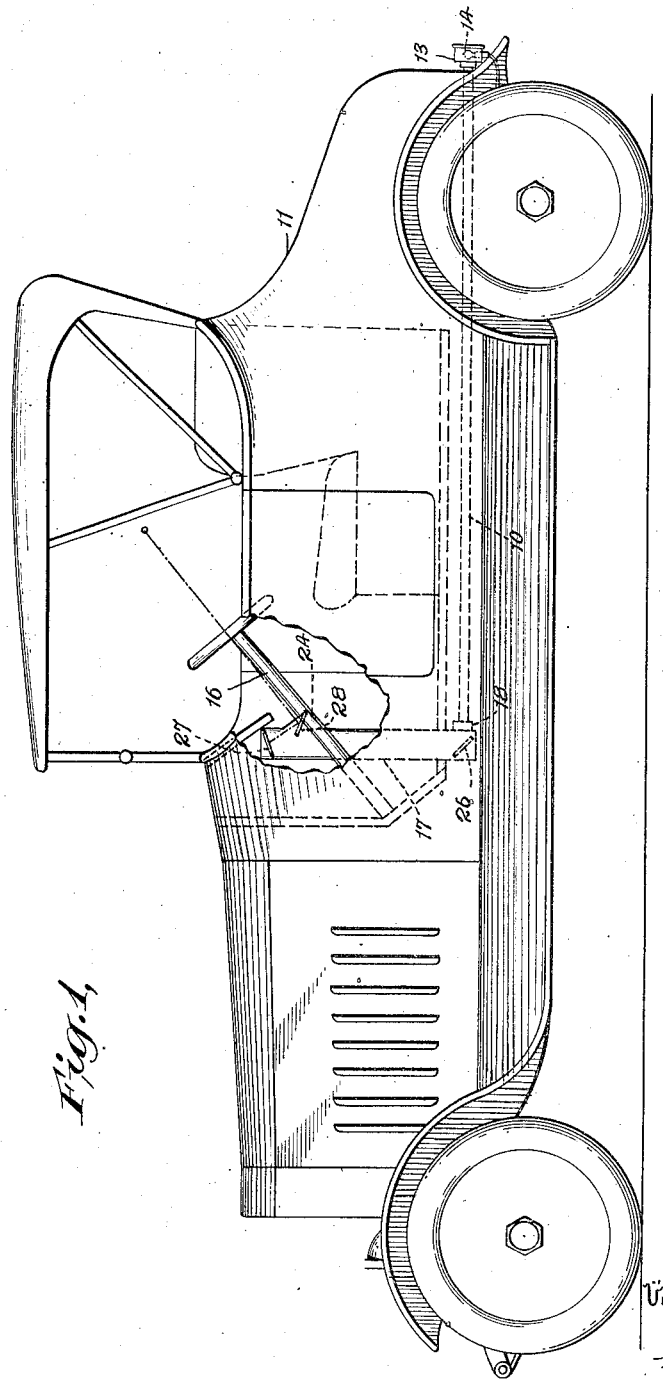

The device or indicator has a tube or pipe 10 which may be supported under the body of an automobile, autotruck or other vehicle, as 11, and one end of the tube may be suitably connected, as at 12, to the casing 13 of the tail lamp, as 14, of the vehicle so that the tube leads into the casing for serving as means to provide a passage, as 15, for transmitting the rays of the light of the lamp when lighted. The tube 10 is preferably of a length so that its second end terminates at the front of the vehicle in proximity to the steering post, as 16, when the device is used on an automobile or like class of vehicle and the second end of the tube may lead into the lower end of a casing, 17 by the second end being screwed or otherwise connected, as at 18, to the casing.

The casing 17 may be of any appropriate size and shape, though the casing illustrated is of a substantially rectangular tubular form to provide a front wall 19, rear wall 20, and side walls 21, 22. In the lower part of the front wall 19 of the casing 18 above the tube 10 may be a peep opening, as 23. The casing is disposed endwise and may be of a length so that its upper end terminates above the steering post of the vehicle. The casing may also be provided with a front extension, as 24, formed by the upper parts of the walls being bent outwardly in somewhat a V-shape, as shown, and in the upper portion of the front wall of this extension is a peep opening 25. The peep openings 23 and 25 are arranged to permit the driver or chauffeur of the vehicle to easily look therethrough into the casing without moving from the seat at the steering post of the vehicle, and in the casing may be one or a number of reflectors, as 26, 27, 28, for reflecting the rays of light transmitted from the tail lamp 14, through the passage 15 to the lower part of the casing.

The reflectors 26, 27, 28 are preferably in the forms of mirrors of substantially rectangular shapes. Protruding from the central part of one end of each of the reflectors is a stud or pin 29, and projecting from the second end of each of the reflectors is a threaded stud or pin 30. All of the reflectors are disposed across the interior of the casing 17 with the studs 29 being rotatably mounted in openings in the side wall 22 of the casing and with the threaded studs 30 being rotatably mounted in openings in the side wall 21 of the casing. The threaded studs 30 of the reflectors may be of lengths so that they extend some distances beyond the casing, and on each of the threaded studs may be a handle, as 31, to allow the studs and reflectors to be readily adjusted rotatively by a person. Also on each and all threaded studs 30 may be a nut 32, and all of these nuts are screwed into engagement with the side wall 21 of the casing for tightening the reflectors against accidental movement when properly adjusted in the casing.

The reflector 26 is arranged in the lower part of the casing 17 for receiving the rays of light transmitted through the passage 15 of the tube 10 from the lamp 14, and this reflector is also positioned so that the reflected rays of light may be observed by the person at the steering post of the vehicle through the peep opening 23. The reflector 27 is arranged in the upper part of the casing above the extension 24 so that by relatively adjusting the reflectors 26 and 27 rotatively the rays of light will be reflected from the reflector 26 to the reflector 27. The reflector 28 is arranged in the extension 24 for being rotatively adjusted to receive the rays of light reflected by the reflector 27 as well as serving to reflect the rays of light through the peep opening 25 of the casing for observation by the driver or chauffeur of the vehicle. Whether one or a number of the reflectors are used the device will serve to permit the operator of the vehicle to observe at frequent intervals if the tail lamp is lighted without being required to depart from the vehicle.

In the foregoing description, I have embodied the preferred form of my invention, but I do not wish to be understood as limiting myself thereto, as I am aware that modifications may be made therein without departing frm the principle or sacrificing any of the advantages of this invention, therefore, I reserve to myself the right to make such changes as fairly fall within the scope thereof.

Having thus described my invention, I claim as new and desire to secure by Letters Patent:—

1. A device of the character described having in combination, a vehicle tail lamp, a tube for conducting rays of light emitted from said lamp to a point adjacent to the driver's seat, a vertical casing communicating at its lower end with the tube and terminating at a point adjacent the instruments on the dashboard of the vehicle, the said casing having in its front face a peep-hole opening formed therein, a reflector adjustably mounted within the casing beneath said peep-hole in a position to be readily observed by the driver, a reflector adjustably mounted in the lower end of the casing in a position to intercept the light rays from said tube, and a third reflector adjustably mounted in the top of said vertical casing arranged to receive the rays of light from the lower reflector and reflect said rays upon the reflector beneath the peep-hole, whereby the driver can observe the condition of the tail light.

2. A device of the character described, having in combination, a vehicle tail lamp, a horizontal tube for conducting rays of light from said lamp to the front portion of the vehicle, a vertical casing adapted to be positioned in front of the driver's seat and communicating at its lower end with the horizontal tube, a projection upon the front face of the casing and adjacent the top thereof, the said projection extending outwardly and downwardly at an angle to the face of the casing, a peep opening formed through said projection, an adjustable reflector within the casing beneath the peep opening in position to be viewed by the driver, an adjustable reflector in the bottom of the casing arranged in the path of the rays emitted from the horizontal tube, and a third adjustable reflector in the top of the casing arranged to receive rays of light from the lower reflector and reflect said rays upon the reflector beneath the peep opening, whereby the driver can observe the condition of the rear tail light.

This specification signed this 30th day of August A. D. 1923.

VITO ANTONIO FIORENTINO.